United States Patent [19]

Mori

[11] 3,860,766

[45] Jan. 14, 1975

[54] OPTICAL SIGNAL REPRODUCING APPARATUS

[75] Inventor: Masafumi Mori, Tokyo, Japan

[73] Assignee: Tokyo Shibaura Electric Co., Ltd., Kawasaki-shi, Japan

[22] Filed: May 31, 1973

[21] Appl. No.: 365,752

[30] Foreign Application Priority Data

May 31, 1972 Japan ................ 47-53324
June 12, 1972 Japan ................ 47-57691
July 20, 1972 Japan ................ 47-71998
July 20, 1972 Japan ................ 47-71999

[52] U.S. Cl. ................ 179/100.4 R, 179/100.41 L, 179/100.41 K, 250/199

[51] Int. Cl. ....... G11b 7/00, H04n 5/76, G11b 3/00

[58] Field of Search ............ 179/100.4 A, 100.4 R, 179/100.41 L, 100.41 K, 100.41 R; 250/199, 227

[56] References Cited

UNITED STATES PATENTS

| | | | |
|---|---|---|---|
| 3,138,669 | 6/1964 | Rabinow et al. | 179/100.4 R |
| 3,325,603 | 6/1967 | Rabinow et al. | 179/100.41 L |
| 3,452,163 | 6/1969 | Dahlen | 179/100.41 L |
| 3,530,258 | 9/1970 | Gregg et al. | 179/100.41 L |
| 3,666,896 | 5/1972 | Laue | 179/100.4 R |
| 3,699,478 | 10/1972 | Pinnow et al. | 250/199 |
| 3,727,062 | 4/1973 | Foster | 250/199 |
| 3,781,700 | 12/1973 | Hansch et al. | 250/199 |

*Primary Examiner*—Alfred H. Eddleman
*Attorney, Agent, or Firm*—Flynn & Frishauf

[57] ABSTRACT

In optical signal reproducing apparatus for reproducing a signal from a recording medium having a groove in which the signal has been recorded as continuous irregularities of a sine curve having a pitch of the order of microns, there are provided a source of light for emanating a light beam of a definite phase, means for projecting the light beam upon the groove after limiting the width of the beam to be less than the minimum pitch of the irregularities, and means for detecting the diffracted light reflected by the irregularities.

11 Claims, 6 Drawing Figures

| | α min | α max |
|---|---|---|
| a | 0° | 20° |
| b | 10° | 30° |
| c | 20° | 40° |

OPTICAL SIGNAL REPRODUCING APPARATUS

This invention relates to an optical signal reproducing apparatus, and more particularly apparatus for reproducing video signals by scanning irregularities in grooves formed on the surface of a recording medium, said irregularities representing the video signals.

Known apparatus for reproducing video signals which have been recorded as continuous irregularities along a groove utilizes a scanning stylus. In such apparatus since the free end of the stylus is held in continuous contact with the signal groove for detecting the signals by the variation of the pressure of the stylus end, wear of the stylus end and the recording medium is inevitable, thus shortening their useful life. Further, the vibration of the stylus and the vibration of the mechanism adapted to support the stylus often resonate thereby causing noises.

Accordingly, it is an object of this invention to provide an optical signal reproducing apparatus which can reproduce video or other signals from a recording medium without wearing the same and without causing noises caused by resonance.

Another object of this invention is to provide an optical signal reproducing apparatus capable of reproducing a signal at high fidelities regardless of the variation in the pitch of the irregularities constituting the recorded signal.

SUMMARY OF THE INVENTION

According to this invention these and other objects can be accomplished by providing optical signal reproducing apparatus for reproducing a signal from a recording medium having a groove in which the signal has been recorded as continuous irregularities of a sine curve having a pitch of the order of microns, characterized in that the apparatus comprises a source of light for emanating a light beam of a definite phase, means for projecting the light beam upon the groove after limiting the width of the beam to an extent smaller than or equal to the minimum pitch of the irregularities, and means for detecting the diffractive light reflected from the irregularities.

This invention can be more fully understood from the following detailed description when taken in connection with reference to the accompanying drawings, in which:

DETAILED DESCRIPTION OF ILLUSTRATED EMBODIMENTS

Figure 1:
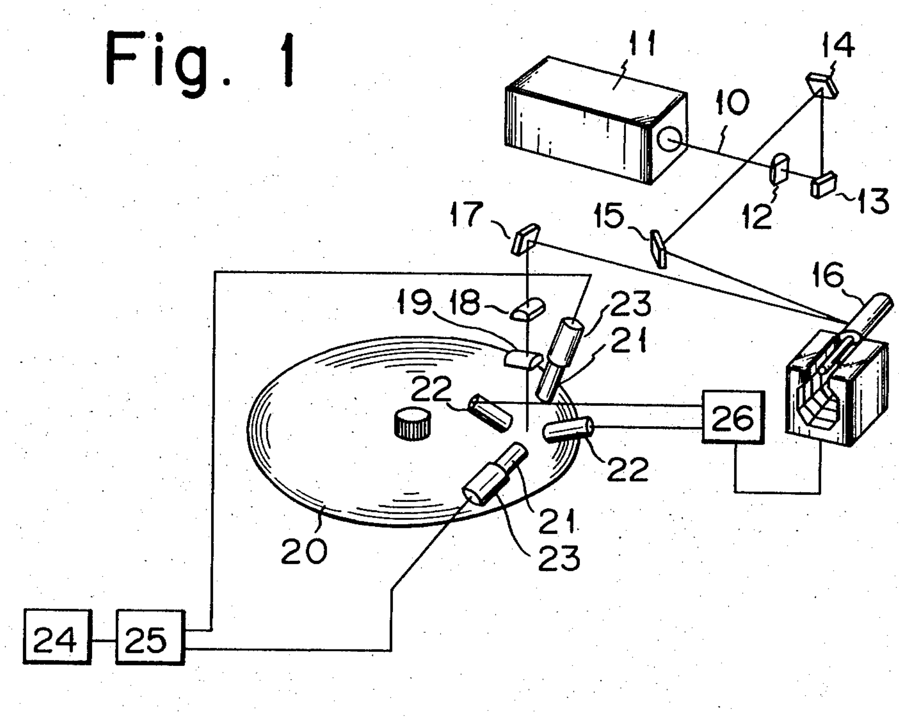
FIG. 1 is a diagrammatic representation of one embodiment of the optical signal reproducing apparatus embodying the invention.

Referring now to FIG. 1 of the accompanying drawings, the optical signal reproducing system show therein comprises a light source 11 capable of emanating a coherent light beam 10, for example, a He—Ne gas laser oscillator. Typically, such a gas laser emanates a light beam 10 having a wavelength of 0.63 $\mu$ and a Gauss distribution. The beam 10 is focused by a first cylindrical lens 12 and then successively reflected by the first, second and third relecting mirrors 13, 14 and 15 toward a light reflector 16. The beam reflected by reflector 16 by a predetermined angle is reflected by a fourth reflecting mirror 17 toward a lower direction along a vertical axis. The vertically reflected beam is then focused respectively by the second and third cylindrical lenses 18 and 19 in a manner to be described later, and the focused beam is projected upon a recording medium 20 which is shown as a circular disc provided with a spiral groove 20*a* (see FIG. 2) of which side wall is formed with continuous irregularities. The disc may be rotated by a conventional driving mechanism, not shown. It should be understood that the recording medium is not limited to a circular disc but may be any desired shape capable of recording the signal as continuous irregularities, such as a tape capable of driving in a predetermined direction.

Figure 2:
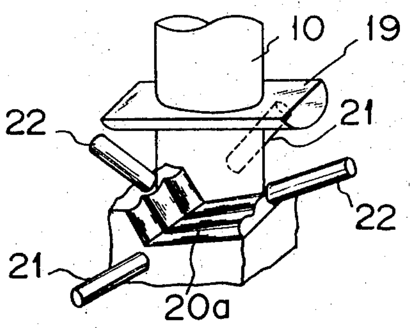
FIG. 2 is a perspective view of a portion of the apparatus shown in FIG. 1.

As best shown in FIG. 2, above the recording medium 20 are provided a pair of bundles of optical fibers 21 and a pair of phototransistors 22, the former positioned on the opposite sides of the beam along the direction of the recording groove 20*a* and the latter positioned on the opposite sides of the beam along the lateral direction of the recording groove 20*a*. The end of each of the members 21 and 22 is directed to the area of the groove where the light beam is incident so that the light diffracted and reflected by said area of impingement is received by the members 21 and 22. To the rear of the pair of bundles of optical fibers 21 are provided means for converting the intensity of the diffracted incident light transmitting through the optical fibers into electric signals, for example, a pair of photoelectric miltipliers 23. The respective output signals from the multipliers 23 are applied to a differential circuit 24 where both signals are compared to produce a difference signal. The difference signal is sent to a demodulator 25 comprising well known differentiating and integrating circuits for producing a voise signal corresponding to the video signal stored on the recording medium.

The output signals from the pair of phototransistors 22 are applied to a differential circuit 26 for producing a difference signal which is sent to the reflector 16 to operate it by an angle corresponding thereto. Accordingly, if the incident beam is reflected from the suitable area across the groove the path of the reflected beam is varied thereby slightly displacing the area of impingement of the beam upon the recording medium in the radial direction thereof. In other words, the apparatus is constructed such that it corrects displacement of the light path so as to cause the beam to always impinge upon the recording groove of the recording medium in a suitable wide matching that of the groove.

The vertical light guiding optical system comprising the reflecting mirror 17 and cylindrical lenses 18 and 19 is supported by a well known mechanism together with the pair of phototransistors 22 and the pair of bundles of optical fibers 21 so as to be movable in the radial direction of disc 20 in synchronism with the rotation thereof. Consequently, the vertical light guiding optical system is moved in the radically inward direction as the disc 20 is rotated whereby the spiral groove recorded with the video signal is scanned continuously.

As above described, since the vertical light guiding optical system includes cylindrical lens 19, the incident area of the light beam projected by it upon disc 20 is made in band or flat form as shown in FIG. 2. The longitudinal direction of the flat beam extends in the direction of the width of the signal groove or the radial direction of the disc 20 and the longitudinal length of the beam is substantially the same as the width of the groove. By using such a flat beam even when the groove has more or less defects or scratches, the beam diffracted and reflected by the groove will not be greatly affected by such defects so that it is possible to reproduce signals from the groove at high fidelities. For this purpose, the optical system is designed such that the flat beam will have a thickness of about 3 microns which is shorter than the wavelength of the signal of the maximum frequency recorded on the disc and a width of about 80 microns which is substantially the same as that of the signal groove.

Figure 3:
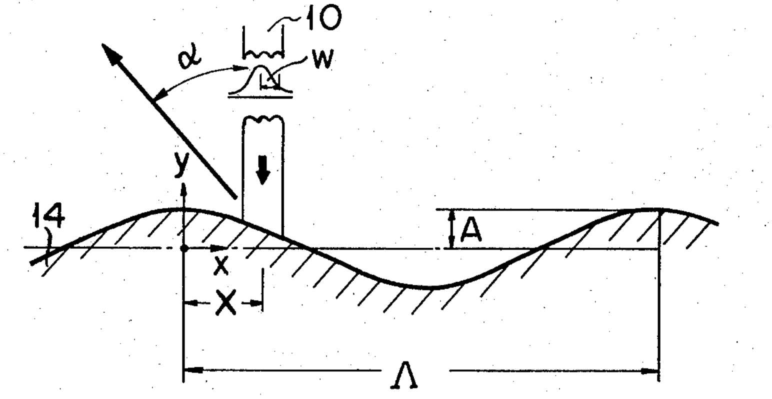
FIG. 3 is a diagram useful to explain the principle of this invention.

The relationship between the signal groove and the diffracted light is as follows:

FIG. 3. is a diagram showing the waveform of a signal recorded on the signal groove of the recording medium or disc along the length of the groove. Denoting the amplitude of the signal by A and the wavelength by Λ, the waveform in the direction of the travelling of the wave can be expressed approximately by an equation $y = A \cos (2\pi x/\Lambda)$. Light beam 10 having a Gauss distribution of radius $w$ at a point $x = X$ on a rectangular coordinate $(x, y)$ is projected upon the rotary disc at right angles with respect to the groove and the intensity of the diffracted light in the direction of $\alpha$ measured from the ordinate is detected. When observing the mirror image of the beam reflected by the surfact of the rotary disc, the intensity $I\alpha$ of the diffracted light in the dirction of $\alpha$ can be shown by the following equation according to the Kirchhoff's law of diffraction $$I\alpha = C \left| \int_{-\infty}^{\infty} \psi(x) \cdot (\cos 2\theta + \cos \alpha) \cdot \exp(-jkx \sin \alpha) dx \right|^2$$

where $\psi(x) \approx \exp -x^2[(1/w^2) + j(\pi/\lambda R)]$, $\theta$ represents the angle between a normal to the plane upon which the light beam is projected and the ordinate, $R$ the radius of curvature of the wave front of the light beam, $\lambda$ the wavelength of light and $k = 2\pi/\lambda$.

Figure 4:
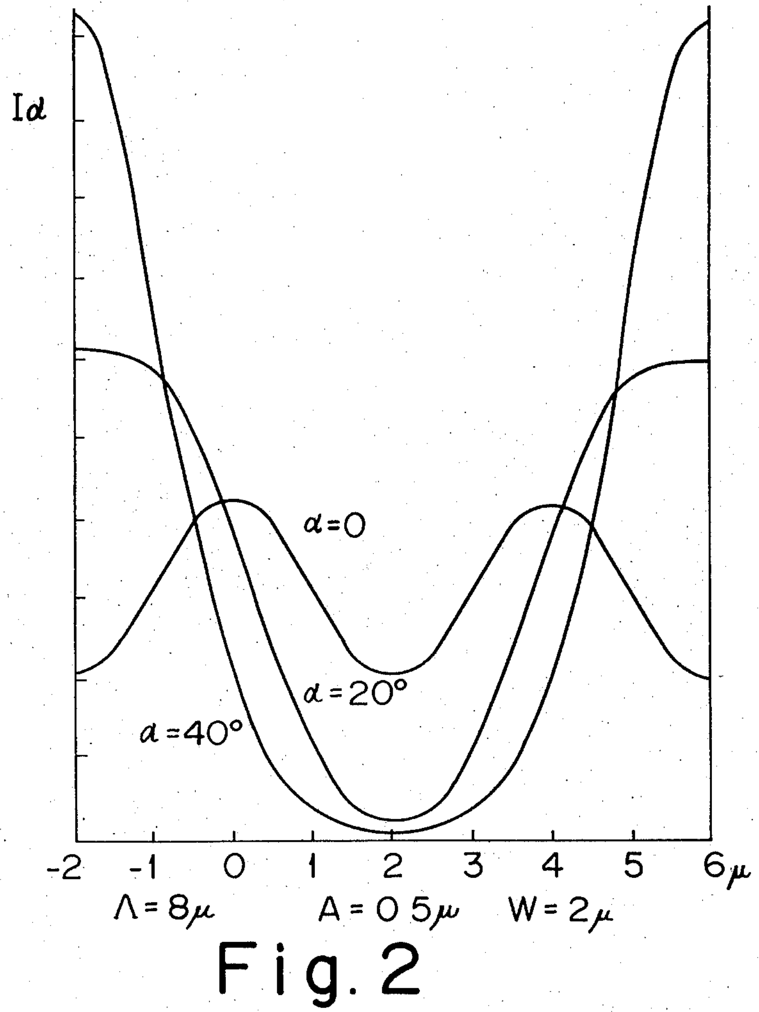
FIGS. 4 and 5 are graphs showing characteristic curves of the intensity of the light measured.
Figure 5:
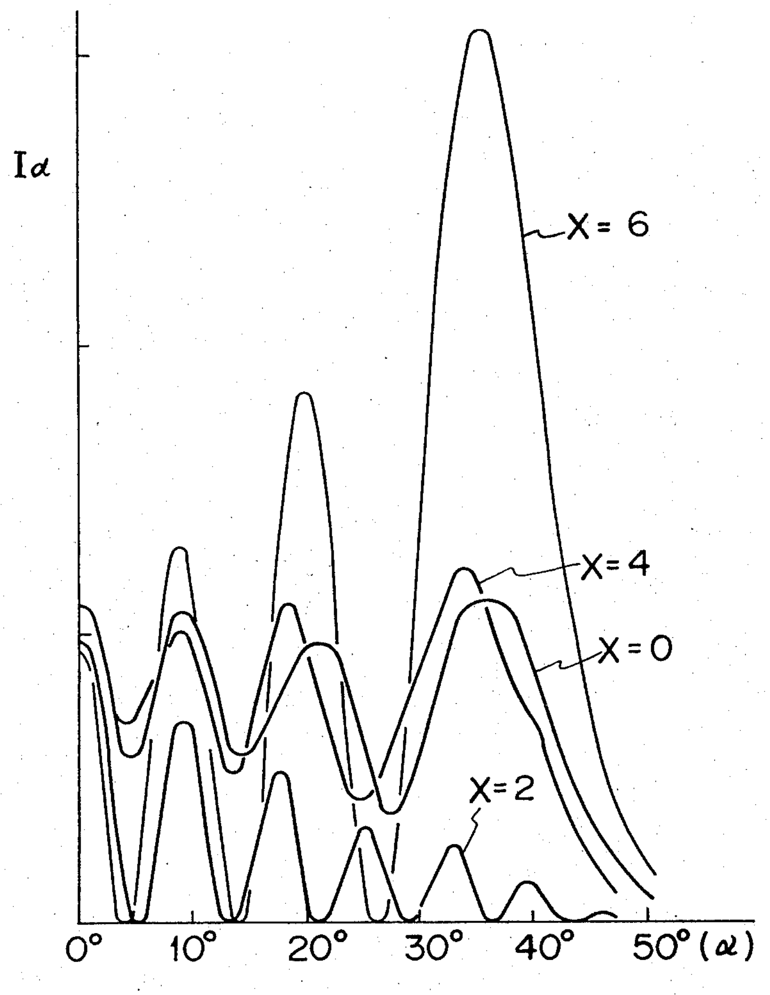

As can be noted from the equation just described the intensity of the diffracted light is a function of $\lambda$, $\Lambda$, $A$ and $w$. When the diffraction is efficiently used by projecting the light beam on the irregularities of the groove with $2w$reduced to the nearly equal to or smaller than Λ, the signal will be reproduced in terms of the variation in the intensity of the light. For example, where $a = 0.5\ \mu$, $w = 2\ \mu$ and $\Lambda = 8\mu$, the relationship between X and $I\alpha$ for different values of $\alpha$ can be shown in FIG. 4. It is preferable to determine X and $\lambda$ such that the peak of the intensity of the light appears within a definite distance. The cases wherein $\alpha = 20°$ and $\alpha = 40°$ are preferred. Where $a = 0.5\ \mu$, $w = 2.5\ \mu$ and $\Lambda = 8\ \mu$, the relationship between $\alpha$ and $I\alpha$ for different values of X is shown in FIG. 5. Preferably, the detection angle $\alpha$ of the diffracted light should be in a definite range so that the curve will have one peak sensitivity.

Figure 6:
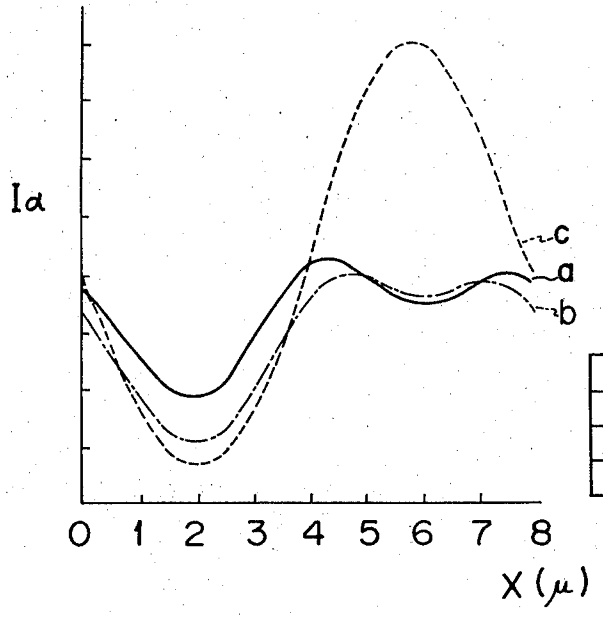
FIG. 6 is a graph showing the relationship between the detection angle of the diffractive light and the intensity of the light measured.

To determine the most suitable range of the detection angle of the diffracted light, under a condition of $\alpha\text{min} < \alpha < \alpha\text{max}$, the relationship between X and the intensity of the light $I\alpha$ in three ranges [0°, 20°], [10°, 30°] and [20°, 40°] was investigated and the results are depicted in FIG. 6. As can be noted from FIG. 6, as $\alpha$min is decreased, the utilization efficiency of the light increases but the contrast of the reproduced signal decreases, and the stability for the variation in the pitch of the irregularities on the surface of the recording medium also decreases. For large $\alpha$, the intensity of the diffracted light is small so that the value of $\alpha$max will not be affected in any appreciable amount. It was found that best result can be obtained when $\alpha$min is set in a range of from 15° to 20° as a result of investigating the result of calculation, the intensity of the incident light, the S/N ratio of a detector and other factors. As above described, the incident light is not required to impinge upon the recording surface always at right angles but may impinge at a predetermined angle in which case it is necessary to set the range of $\alpha$ to a value commensurate with the incidence angle.

Where the diffracted light is detected with a narrow angle range it is impossible to stably detect the recorded signal because there are variations in the wavelength Λ and amplitude A of the recorded irregularities. However, when the diffracted light is detected with a wide angle range as above described this problem can be obviated. For example, where the pitch of the irregularities varies or where there are fine irregularities that cause noises, when the diffracted light is detected in a limited angle range, there will be two peaks in the detector output in one pitch of the irregularities for certain angle of detection. However, when the minimum value of $\alpha$ is set within a range of from 15° to 20° and the diffracted light is detected in a wide angle range as above described, there will be only one peak in one pitch of the irregularities. This was affirmed not only by calculation but also by experiment.

Although in the foregoing description of the preferred embodiment, for the purpose of detecting the diffracted light in a wide range, bundles of optical fibers were disposed close to the incident area of the light beam upon the recording surface so as to utilize wide end areas of the bundles, it should be understood that the invention is not limited to such particular arrangement and that it is possible to use many other arrangements. For example, the diffracted light to be detected may be passed through a diffusion plate or focused by a lens. Furthermore when detecting the diffracted light, it can be differently weighted dependent upon the angle of diffraction.

What is claimed is:

1. Optical signal reproducing apparatus comprising a recording medium including a groove storing a signal as continuous sine curve shaped irregularities having a pitch of the order of microns, a source of light for emanating a light beam of a definite phase, means for projecting said beam upon the groove of said recording medium after limiting the width of said beam to an extent smaller than or equal to the minimum pitch of said irregularities, and means for detecting the diffracted light reflected by said irregularities.

2. An apparatus according to claim 1 wherein said light source comprises a gas laser.

3. An apparatus according to claim 1 wherein said beam projecting means comprises means for forming a flat beam having a width substantially equal to that of said groove.

4. An apparatus according to claim 1 wherein said recording medium comprises a rotatable disc formed with the spiral groove.

5. An apparatus according to claim 1 wherein said beam projecting means includes means for projecting said beam at right angles with respect to the groove of said recording medium.

6. An apparatus according to claim 5 wherein said detecting means is disposed to detect a component of the diffracted light produced by the reflection of said normally projected beam, said component inclining at a predetermined angle with respect to the projected beam.

7. An apparatus according to claim 6 wherein said detecting means is disposed to detect a component having an angle of inclination of at least 15°.

8. An apparatus according to claim 6 wherein said detecting means comprises a bundle of optical fibers for transmitting the diffracted light, and means arranged to receive the diffracted light transmitted through said bundle for generating an electric signal corresponding to the intensity of the received light.

9. An apparatus according to claim 6 wherein said detecting means comprises a pair of bundles of optical fibers disposed along the groove of said recording medium, a pair of photosensitive devices disposed to detect the diffracted light transmitted through respective bundles of optical fibers for converting said diffracted light into electric signals, and a differential circuit for producing a difference signal between said electric signals.

10. An apparatus according to claim 1 which further includes means for detecting the deviation of the light beam projected upon the groove of said recording means, and means to correct such deviation.

11. An apparatus according to claim 10 wherein said correcting means comprises a pair of photosensitive devices positioned on the opposite sides of the groove of said recording medium, a differential circuit for producing a difference signal between the outputs of said photosensitive devices, and means for varying the position of the projected light beam by an amount corresponding to said difference signal.

* * * * *